D. A. CHURCH.
Harvester and Thrasher.

No. 2,074.

4 Sheets.—Sheet 1.

Patented May 4, 1841.

D. A. CHURCH.
Harvester and Thrasher.

No. 2,074.

4 Sheets.—Sheet 3.

Patented May 4, 1841.

D. A. CHURCH.
Harvester and Thrasher.

No. 2,074.

4 Sheets.—Sheet 4.

Patented May 4, 1841.

UNITED STATES PATENT OFFICE.

DAMON A. CHURCH, OF FRIENDSHIP, NEW YORK.

ENT IN HARVESTING-MACHINES FOR CUTTING, THRASHING, AND WINNOWING GRAIN.

Specification forming part of Letters Patent No. 2,074, dated May 4, 1841.

*To all whom it may concern:*

Be it known that I, DAMON A. CHURCH, of Friendship, in the county of Allegany and State of New York, have made certain new and useful Improvements in the Harvesting-Machine, by means of which improved machine grain is to be cut, thrashed, winnowed, and delivered into bags; and I do hereby declare that the following is a full and exact description thereof.

I am aware that machines have been heretofore made in which the respective intruments necessary for the performance of the different processes above enumerated have been combined, and I do not therefore claim to be the first to have made such a combination; but in carrying out my plan I have made certain improvements in the manner of constructing and arranging the various parts thereof so as to render my combined machine more certain and efficient in its operation than any which has been heretofore devised.

Figure 1:
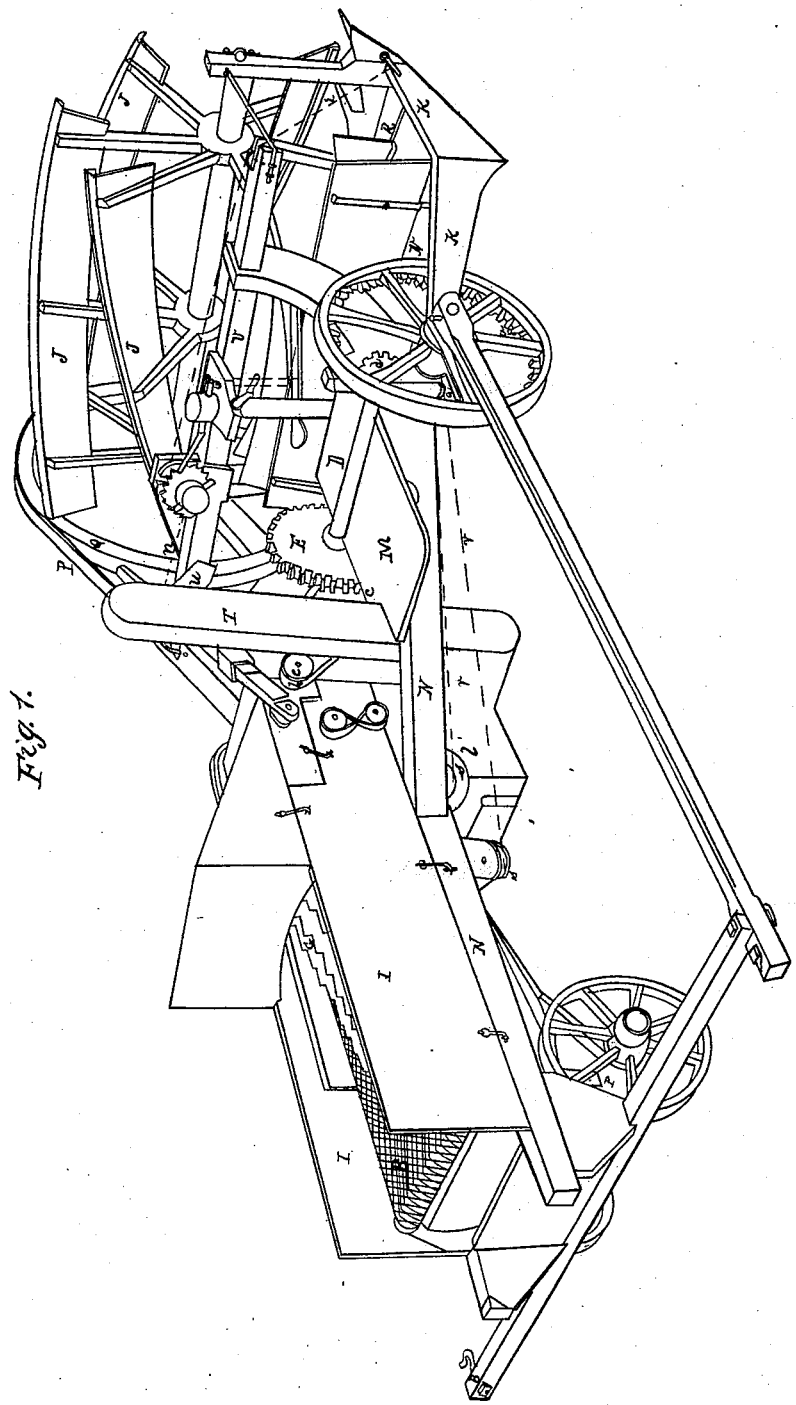
Figure 2:
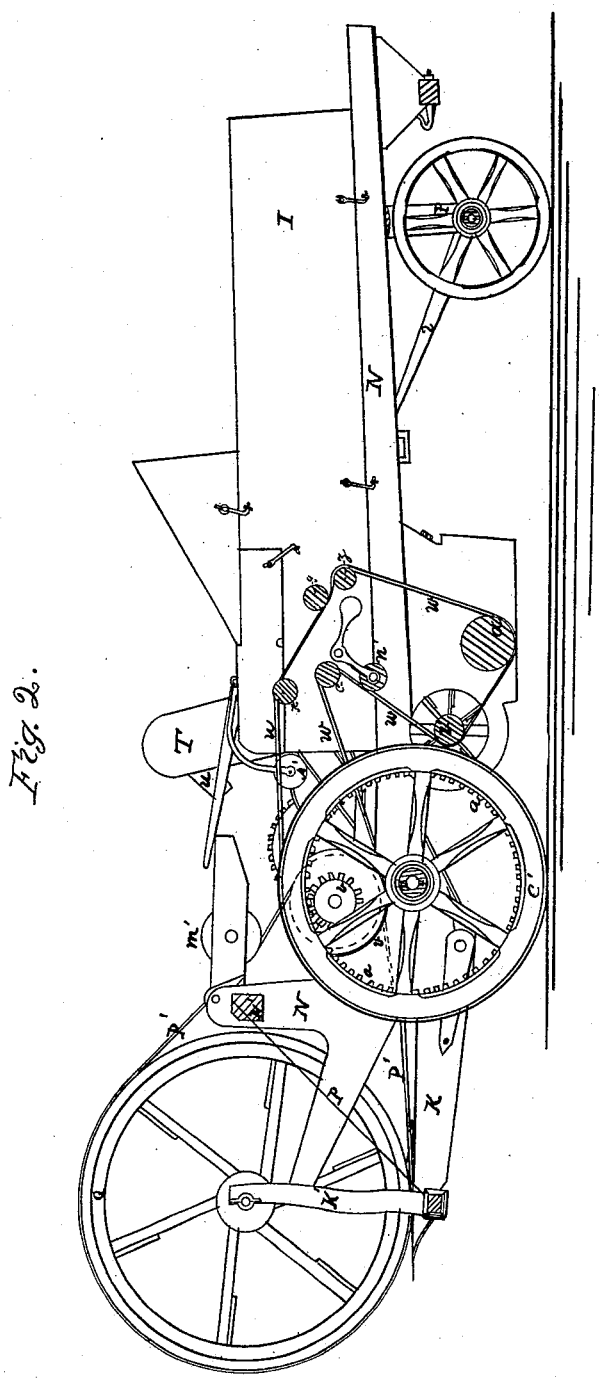
Figure 3:
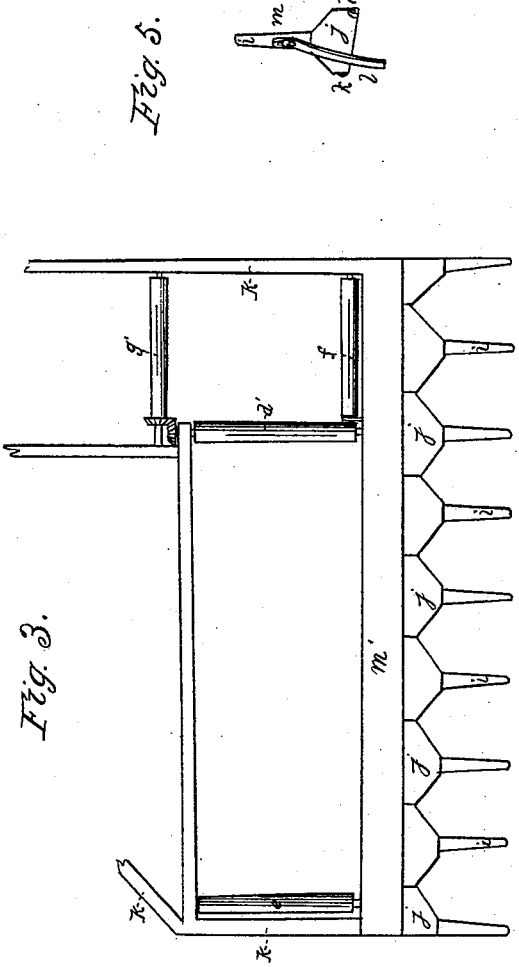

In the accompanying drawings, Figure 1 is a perspective representation of the whole machine. Fig. 2 is a side view thereof, taken from the side opposite to that shown in Fig. 1; Fig. 3, a representation of the cutting apparatus, and Fig. 4 a vertical section through the thrashing and winnowing portion of the instrument.

Four horses are in general employed to drive this machine, one on each side of the shaft A, and two on the opposite side, which last pair may draw upon the hook at B. The ground or driving wheel C has teeth $a\ a$ on the inside of its periphery, and these mesh into the teeth of the pinion $b$ on the end of the shaft D, which shaft carries the cog-wheel E, thereby serving to give motion to the thrashing-cylinder, and through it to other parts of the machinery. The cog-wheel E gears into a pinion at $c$ on the center of a band-wheel, a portion of which is seen at $d$. The band from this wheel passes round the whirl $e$, which is on the shaft of the thrashing-cylinder. The thrashing apparatus may be made in any of the various modes of constructing cylinder and concave thrashing-machines, and does not present any feature of novelty requiring description.

$f$ is a whirl on the end of one of the rollers of an endless apron, which is intended to carry the grain and chaff to a wind or blowing wheel, operating like the common fanning-mill. The roller to which $f$ is attached is driven from the opposite side of the machine, as will be seen at $z$ in Fig. 2.

G is a frame work of slats, upon which the grain and straw from the thrashing-machine are delivered, and which is agitated or shaken by motion given to it from the whirl $g$ in a manner well known. By its agitation the thrashed heads and straw have the grain shaken out.

H is a lever, which has a pulley on an arm descending from it, and bearing on the band $h$ of the thrashing-machine, serving to tighten it.

F is a second endless apron placed above that first named, and made of netting, with meshes of such size as to allow the grain to fall through it, while it carries off the straw and delivers it out from the end of the trough I of the thrashing-machine.

J J J, Fig. 1, are the blades or longitudinal pieces, which reach from end to end of what I denominate the "gathering-wheel." These blades serve to carry and press the grain against the cutters, by which the heads are to be separated from the straw. Their outer edges are for this purpose armed with iron.

Figure 4:
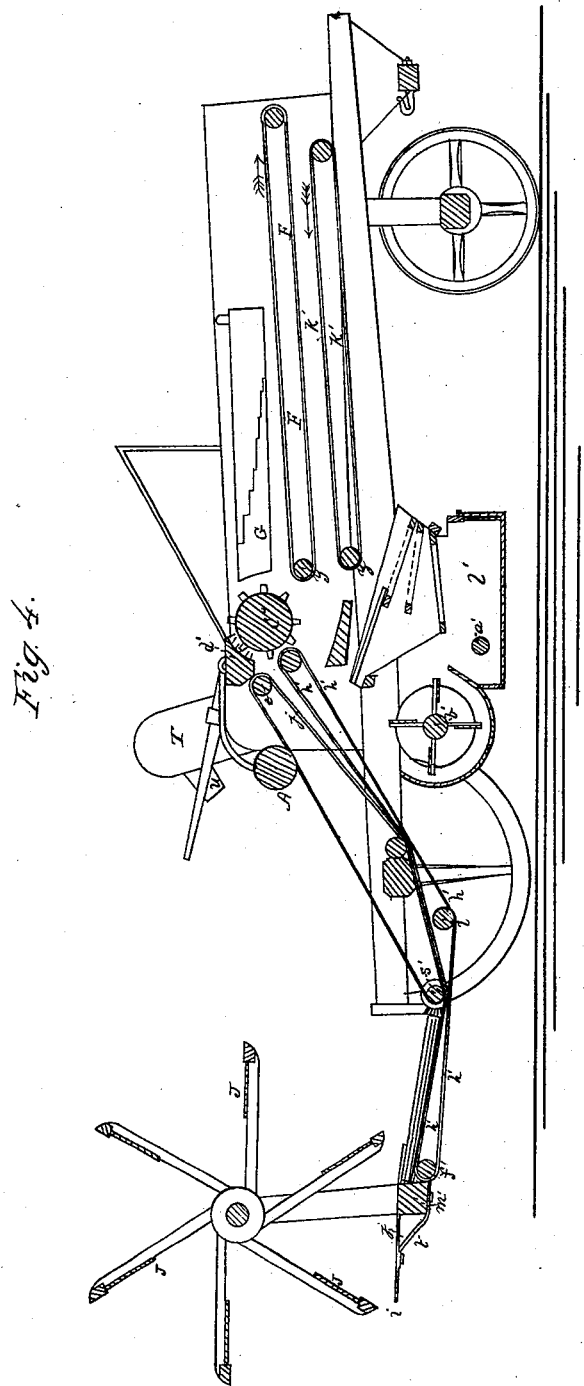

In Fig. 3, $i\ i\ i$ are points or prongs, which project out from the fore ends of the knives or cutters $j\ j\ j$. The grain is received between the points $i\ i\ i$, and is forced by the blades of the gathering-wheel against the cutters $j\ j\ j$. Fig. 5 shows the under side of one of the cutters each of which is furnished with ears or staples $k\ k$, through which a rod is to pass, by which the whole of them are hung to the fore rail of the cutter-frame or stage. To sustain them in place they are each acted upon by a spring, $l$, furnished with a sliding pin at $m$, and fastened at their rear ends to the under side of the fore rail, $m'$, of the cutter-frame, as shown in Fig. 4, which gives a side view of the cutter and spring. The rod or joint-pin, passing through the ears $k\ k$ and through staples on the cutter-rail, serves to draw and hold the cutters together, while they are left free to descend by the pressure of the blades of the gathering-wheel upon them. By this arrangement the edges of the blades of the gathering-wheel may bear upon the cutters and insure the regular cutting of the grain. The frame or stage K K, upon which the cutters $j\ j$ are fixed, and which also sustains the gathering-wheel, (one of its supports is shown at K',) is made so as to be raised and lowered at pleasure by the conductor of the machine. On the side shown in Fig. 1 the axle of the driving-wheel C passes through the frame K, and serves to sustain the back end of this frame. The conductor of the machine is to stand upon the platform M, where his business is to manage the apparatus for raising and lowering the stage K and that for governing the hind or guide wheels.

L is a windlass, furnished with a ratchet-wheel and pawl, and turning on the stationary rail N', making a part of the frame N N of the machine. Around this windlass two lines pass, as shown at $n\ n$. These lines may be wound by turning it. They pass over pulleys $o\ o$ at the ends of the stationary rail N', and are attached to the front of the stage at $p$, thereby serving to raise and lower it at pleasure. The grain is intended to be cut as near to the heads as can be conveniently done, and by the foregoing arrangement the stage and cutters may be readily adapted to the required height. The guiding or steering apparatus is also shown in Fig. 1.

O is a vertical shaft, carrying a pulley, $q$, on its lower end, to which is attached the lines $r\ r$, which pass around guide-pulleys $s\ s$, and have their ends attached to the tongue $t$ of the truck or guide-wheel carriage P in such manner as to move said tongue in either direction, as required. The gathering-wheel is driven by the passing of a band, P', round a large rim, Q, attached to one end of it. The manner of doing this will be most distinctly shown in Fig. 2. The grain as it is cut passes from the knives onto an endless revolving apron, R, which extends crosswise behind said knives, and by which it is carried to the side where it is to be thrashed.

S S is a guard or fender board, to prevent the heads as they are cut from being scattered.

T is a hollow trunk containing elevators of the ordinary kind for carrying the grain up after it has been winnowed, so that it may be delivered into and pass through the spouts $u$, around which the mouth of a bag may be tied.

Fig. 4 is a vertical section along the middle of the trough I I, from front to back of the machine, showing the position of the endless aprons which operate in this part, and of the thrashing and winnowing apparatus. The guide-rollers shown in this figure and the whirls by which they are turned, as represented in Fig. 2, are designated by the same letters of reference. C', Fig. 2, is the ground or driving wheel on this side of the machine, which has, like C in Fig. 1, teeth $a\ a$ on its interior, meshing into a pinion, $b$. On the shaft $u^2$ of this pinion there is a whirl, $v$, which receives the strap $w\ w$, that carries the whirls $x$, $y$, $z$, $a'$, $b'$, and $c'$.

In the section Fig. 3, $x\ y\ z$ are rollers of endless aprons, turned by the whirls $x\ y\ z$.

$a'$ is a shaft that carries a roller at the lower end of the case T, containing the elevators, and $b'$ the shaft of the fan-wheel.

$c''$ is a thrashing-cylinder, which receives its motion from the opposite side, as described.

$d'$ is a concave, set with teeth in the ordinary manner.

The heads of grain I have said are delivered from the cutters onto an endless apron, R, Fig. 1. This apron extends along behind the cutters until it reaches the part where it meets the endless aprons, by which the grain is to be conducted up to the thrashing-machine. In Fig. 3 I have shown a top view of a part of the cutter-frame, containing some of the rollers that carry these endless aprons which operate in this portion of the machine the aprons themselves not being shown.

$d'\ e'$ are the rollers which carry the endless apron R.

$f'$ and $g'$ are two rollers, standing at right angles to the former, and an endless apron which passes round $f'$ and under $g'$ receives the heads from the apron R, and carries them back to be elevated to the thrashing-machine between this and another endless apron. The rollers $d'$ and $g'$ are geared together at their inner ends by beveled pinions on their shafts, so as to communicate motion from $g'$ to $d'$. The rollers $f'$ and $g'$ are seen in section in Fig. 4. $h'\ h'$ is the endless apron, which passes round $f'$ and is driven by $c'$, $i'$ and $r'$ being merely guide-rollers.

$j'\ j'$ is an endless apron, which receives the heads of the grain on its under side between it and the apron $h'$, and by these they are carried up to the thrashing-cylinder, $c''$. From this the thrashed heads are thrown onto the slat frame, G, a similar frame being used in some other thrashing-machines.

F F is the endless apron of netting, with meshes sufficiently small to prevent the passing through of the thrashed heads and straw, but allowing the grain to fall upon an endless apron, $k'\ k'$, below it. This last apron is driven by the rollers Z, and carries the grain back, so as to cause it to fall down in rear of the fan-wheel $b'$, by which the chaff and dirt are blown out, while the grain falls into the box or receiver $l'$, whence it is raised by the elevators in the case T. These elevators, the fan-wheel, and its appurtenances do not differ in construction from those in common use, and are not claimed therefore as making any part of my invention.

The gathering-wheel is driven from a whirl on the same shaft with that of the whirl $v$, by the latter of which it is hidden, but its position is represented on it by dotted lines. A band, P', embracing this whirl, passes round the rim Q. Of the gathering-wheel, $m'$ is a tightening-pulley to this band, and $n'$, a tightening-pulley to the band $w\ w$. A' is a tightening-roller, which bears upon the elevating-apron $j'\ j'$, between which and the apron $h'\ h'$ the grain is elevated.

Having thus fully described the nature of my machine for cutting, thrashing, and cleaning grain, and shown the combination and action of the respective parts thereof, it is to be understood that I do not claim, as before stated, to be the first to have attempted to perform the process of cutting, thrashing, and winnowing grain by means of one combined machine, my invention consisting of certain improvements in the construction of certain parts thereof and in the particular manner in which I have combined these parts with each other.

I claim—

1. The manner of constructing the knives or cutters so as to hang each of them upon a rod or joint-pin, while they are each sustained by a spring in the manner set forth, by which means they are regularly borne up against the edges of the gathering-wheel, rendering its action upon them uniform and perfect.

2. The combination of the endless aprons R, $h'$, and $j'$, in the manner set forth, for carrying the cut grain from the cutters or knives to the thrashing-cylinder.

3. The combination of the endless aprons F and $k'$, the former being made of net-work, for the purpose set forth, and the latter receiving the grain therefrom and carrying it back to the winnowing apparatus by an arrangement and combination of parts substantially the same with that described.

DAMON A. CHURCH.

Witnesses:
  THOS. P. JONES,
  CHAS. H. CRAGIN.